(12) United States Patent
Bogdahn et al.

(10) Patent No.: US 8,826,865 B2
(45) Date of Patent: Sep. 9, 2014

(54) GRIP FOR GRASPING WITH ONE HAND AND A LEASH DEVICE WITH SUCH A GRIP

(71) Applicant: Flexi-Bogdahn Technik GmbH & Co. KG, Bargteheide (DE)

(72) Inventors: Manfred Bogdahn, Hamburg (DE); Michael Schmidt, München (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 0 days.

(21) Appl. No.: 13/644,314

(22) Filed: Oct. 4, 2012

(65) Prior Publication Data
US 2013/0081580 A1    Apr. 4, 2013

(30) Foreign Application Priority Data
Oct. 4, 2011   (DE) .......................... 10 2011 114 640

(51) Int. Cl.
*A01K 27/00*       (2006.01)
(52) U.S. Cl.
USPC ............................ 119/796; 119/795; 119/797
(58) Field of Classification Search
USPC .......... 119/795, 797; 294/15, 17, 19.3, 25, 26
See application file for complete search history.

(56) References Cited

U.S. PATENT DOCUMENTS

| 1,338,376 | A  | * | 4/1920 | Kocha ............................. 81/163 |
| 7,044,080 | B2 | * | 5/2006 | Rabello ...................... 119/61.56 |
| 7,225,544 | B2 | * | 6/2007 | Petzl ................................ 30/381 |
| 2003/0145804 | A1 |  | 8/2003 | Vaccari |
| 2007/0006821 | A1 | * | 1/2007 | Mitnick ........................ 119/795 |
| 2011/0083617 | A1 |  | 4/2011 | Townsend et al. |
| 2013/0008392 | A1 | * | 1/2013 | Holmstrom ................... 119/796 |

FOREIGN PATENT DOCUMENTS

| DE | 299 04 882 U1 | 6/1999 |
| JP | 2003-319729 A | 11/2003 |
| JP | 2004-504040 A | 2/2004 |
| JP | 2007-307626 A | 11/2007 |

* cited by examiner

*Primary Examiner* — Kimberly Berona
*Assistant Examiner* — Michael Wang
(74) *Attorney, Agent, or Firm* — McGlew and Tuttle, P.C.

(57) ABSTRACT

A grip (10) is provided for grasping with one hand, especially for holding a leash device (46) for rolling up and unrolling a leash for leading an animal. The grip has a rigid gripping part (12). The grip (10) makes possible a high carrying comfort for people having different hand sizes and/or hand widths. The grip includes an adjustable grip length limitation (11), provided for adjusting a grip length for different hand widths.

20 Claims, 9 Drawing Sheets

GRIP FOR GRASPING WITH ONE HAND AND A LEASH DEVICE WITH SUCH A GRIP

CROSS REFERENCE TO RELATED APPLICATIONS

This application claims the benefit of priority under 35 U.S.C. §119 of German Patent Application DE 10 2011 114 640.0 filed Oct. 4, 2011, the entire contents of which are incorporated herein by reference.

FIELD OF THE INVENTION

The present invention pertains to a grip for grasping with one hand, especially for holding a leash device for rolling up and unrolling a leash for leading an animal, having a rigid gripping part.

BACKGROUND OF THE INVENTION

A grip of this type is known, for example, from DE 299 04 882 U1. Herein, the grip is designed as an integral component of a housing for a leash device. The leash device has a leash, which can be rolled up and unrolled, for leading an animal, for example, a dog or a cat. The leash device can be carried with a single hand by means of the grip.

The drawback here is that the length of the rigid gripping part is fixed. Consequently, it is necessary to provide a gripping part that can be used as universally as possible, namely for as many different hand sizes and/or hand widths as possible. However, there is a risk here that the carrying comfort is insufficient for people with a small hand size and/or hand width.

As an alternative, it is also conceivable to provide a plurality of different grips with different lengths for the gripping part for different hand sizes and/or hand widths. Consequently, the production and supply cost is considerably increased, however.

SUMMARY OF THE INVENTION

Therefore, a basic object of the present invention is to perfect a grip of the type mentioned in the introduction, such that the grip makes possible a high carrying comfort for people with different hand sizes and/or hand widths.

To accomplish the object of the present invention, a grip for grasping with one hand, especially for holding a leash device for rolling up and unrolling a leash for leading an animal, comprises a rigid gripping part and an adjustable grip length limitation provided for adjusting a grip length for different hand widths.

It is advantageous in this case that the same grip can be adjusted for people with different hand sizes and/or hand widths. Thus, a grip size position, which is connected with a sufficiently high carrying comfort, is feasible for any hand size and/or hand width. Because of the rigid gripping part, the grip here is, in addition, stable and makes possible a more secure hold. The grip length can be adjusted because of the additional adjustable grip length limitation. The grip length can preferably be adjusted by means of the grip length limitation in an area of the gripping part that is associated with the hand when using a hand edge and/or a little finger. Consequently, because of the adjustability of the grip length limitation, it can be guaranteed that a grip size position is feasible, in which the hand edge and/or the little finger can be placed at the grip length limitation. Consequently, a more secure hold of the grip and/or gripping part is made possible. In the present case, a little finger is defined as being the finger between a ring finger and a hand edge. The grip length limitation can preferably be fixed in the respective grip size position, especially by means of a fixing means.

According to another embodiment the grip length limitation can be adjusted and/or positioned in the longitudinal direction of the gripping part by means of an adjusting mechanism. A continuous and/or intermittent adjustability and/or positionability of the grip length limitation, especially between two stops, can be made possible by means of the adjusting mechanism. Thus, discrete, preset grip size positions or continuously variable grip size positions are feasible. The adjusting mechanism can be designed as mechanical, electric and/or electromechanical. Preferably, the grip length limitation has a U-shaped design. The gripping part especially has a hand surface gripping side for the at least partial placing of a hand inner surface and a finger gripping side for the at least partial placing of finger inner surfaces. Consequently, a more secure hold of the rigid gripping part in the hand when using the grip can be achieved.

The grip length limitation is especially arranged at the gripping part for at least partially embracing a little finger and/or hand edge. Consequently, an even more secure hold of the grip in the hand can be guaranteed. Consequently, the grip lies securely in the hand especially in a leash device, which is subjected to tension during use, for example, when leading an animal.

According to a variant, a grip strap, which is connected to the gripping part and especially designed as being in one piece with the gripping part, is provided. The grip strap is especially designed as being rigid. The grip strap and/or gripping part are preferably designed as one-piece components of a housing of a leash device. The grip strap especially faces a finger gripping side of the gripping part. Consequently, the fingers, especially the outsides of the fingers, are protected. A housing part for a leash roller can be arranged in an area of the grip strap facing away from the finger gripping side. During use, the leash or leash roller is positioned in front of the hand starting from a person holding the grip. Consequently, a good functionality of the leash device with a simultaneously high carrying comfort is achieved.

The grip strap and gripping part especially form a grip opening for at least partially passing through fingers. The grip opening is preferably enclosed by the grip strap and gripping part. An especially stable construction is achieved as a result. The grip length limitation is especially arranged within the grip opening. The maximum grip size position can be preset by the size of the grip opening. By means of the adjustable grip length limitation, grip size positions that are smaller in comparison to the maximum grip size position are feasible. To this end, the grip length limitation can preferably be adjusted within the grip opening.

According to another embodiment, in a maximum grip size position, the grip length limitation is at least partially integrated into the gripping part and/or into the grip strap. Consequently, aesthetically attractive shapes are feasible. In addition, a reduction in the maximum grip size position can be avoided by providing the grip length limitation. The grip length limitation is preferably adjustable for reducing the grip size position in the longitudinal direction of the gripping part. Consequently, the grip length can be adjusted in an effective and simple manner for different hand widths.

The adjusting mechanism is preferably designed as a displacing mechanism and/or as a pivoting mechanism. In case of a displacing mechanism, the grip length limitation is displaceable, especially in the longitudinal direction of the gripping part. The adjusting mechanism is especially designed as a combination of a displacing and a pivoting mechanism. Herein, the grip length limitation is both displaceable and pivotable. The pivoting and displacing may take place independently of each other or simultaneously with each other. A large number of adjusting mechanisms is feasible as a result. In case of a pivoting mechanism, a pivot axis, which is especially associated with the gripping part or grip strap and/or is displaceable with the displacing mechanism, is provided for pivoting the grip length limitation. The pivot axis may have a material design or be provided as a virtual pivot axis, about which the grip length limitation is pivotable.

According to a variant, an actuating element is provided for actuating the adjusting mechanism. The actuating element may be designed as a button, a rotating wheel or a knurled wheel. The actuating element is preferably associated with the gripping part, grip strap or grip length limitation. The actuating means is especially provided and correspondingly positioned for actuating with at least one finger of the hand during the holding of the grip with the hand. The actuating element is preferably designed for actuating with the thumb of the hand, which holds the grip or gripping part during use. Consequently, a simple, comfortable and fast operatability and/or adjustability of the grip size is made possible.

According to another embodiment, the displacing mechanism and/or pivoting mechanism have a gear mechanism, locking mechanism and/or clipping mechanism. Consequently, a large number of adjusting mechanisms is feasible. In case of a locking mechanism, first locking elements and/or a locking strip, which interact especially with at least one second locking element and/or locking parts of the grip length limitation, are preferably arranged in the area of the gripping part and/or of the grip strap. Preset grip size positions can be adjusted by means of such a locking mechanism.

The displacing mechanism preferably has a spindle arranged in the gripping part or grip strap. The spindle is especially rotatably mounted within the gripping part or grip strap. Preferably, the spindle is aligned, with respect to its longitudinal alignment, in, and especially parallel to, the longitudinal alignment of the gripping part or grip strap. The spindle can be actuated by means of an actuating element, and especially a rotating wheel, for adjusting the grip length limitation interacting with the spindle. In this case, the actuating element can be connected to the spindle. The actuating element is preferably designed as a knurled wheel, which is rigidly connected to one end of the spindle. Here, the position of an axis of rotation of the knurled wheel may be identical to the position of an axis of rotation of the spindle. A circumferential surface of the knurled wheel may be freely accessible at least partially in the area of the finger gripping side, the hand surface gripping side and/or a lateral surface of the rigid gripping part for actuating the actuating element.

The grip length limitation preferably has a spindle nut, which interacts with the spindle. When the actuating element is actuated, the spindle is displaced in one rotation. Consequently, the spindle nut, which is arranged nonrotatably in the gripping part or grip strap, moves in the longitudinal direction of the spindle, as a result of which the grip length limitation is adjusted.

A leash device for rolling up and unrolling a leash, especially for leading an animal, having a grip according to the present invention, is especially advantageous. The grip is preferably integrated in a housing of the leash device. Thus, the grip is used for carrying the leash device. The leash device may have a roll of cable with a leash that can be rolled up and unrolled built into the housing. The leash may be designed as a cable and/or as a belt. The leash can be led from the housing outwards by means of a housing opening. A braking means, especially a brake button, is preferably provided. The unrolling and/or rolling up movement of the leash roller can be stopped by means of the braking means. Consequently, a shorter leash partial length deviating from the maximum leash length can be fixed. A restoring mechanism, especially a restoring spring, may also be provided to roll up the leash onto the leash roller automatically.

The present invention is explained in detail below on the basis of figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
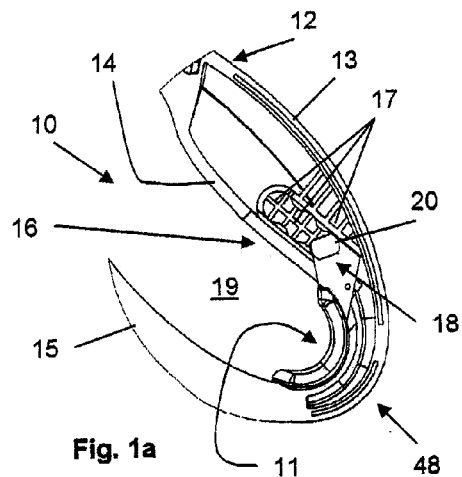
FIG. 1a is a cut-away lateral view of a first grip according to the present invention showing one of different grip size positions of a grip length limitation.

Referring to the drawings in particular, FIGS. 1a through 1e show cut-away lateral views of a first grip 10 according to the present invention with different grip size positions of a grip length limitation 11. The grip 10 is an integral component of a housing, not shown here in detail, of a leash device. The grip 10 has a rigid gripping part 12, which is provided for grasping with a single hand, not shown here in detail.

The rigid gripping part 12 has a hand surface gripping side 13 and a finger gripping side 14 which is arranged facing away from the hand surface gripping side 13. When using the grip 10, the gripping part 12 is grasped, such that a hand inner surface of the hand is at least partially in contact with the hand surface gripping side 13. Furthermore, finger inner surfaces are at least partially in contact with the finger gripping side 14 when using the grip 10. The gripping part 12 is ergonomically shaped for grasping with a single hand.

Furthermore, a grip strap 15 is provided. The grip strap 15 is designed as being in one piece with the gripping part 12 and faces the finger gripping side 14. During use, the outsides of fingers face the grip strap 15. The grip strap 15 and gripping part 12 form a grip opening 19 for the at least partial inserting and/or passing through of fingers for grasping the grip 10.

The grip 10 has an adjusting mechanism 16 for adjusting the grip length limitation 11. The grip length limitation 11 has an essentially U-shaped design. Furthermore, the grip length limitation 11 is designed as being rigid in the exemplary embodiment shown here. The grip length limitation 11 is arranged at the gripping part 12 for at least partially embracing a little finger and/or a hand edge. By means of the adjusting mechanism 16, the grip length limitation 11 can be adjusted for adjusting a grip length for different hand widths.

In the exemplary embodiment shown here, the adjusting mechanism 16 is integrated in the gripping part 12 and at the same time is designed as a displacing mechanism and as a pivoting mechanism. First locking elements 17 are provided for displacing the grip length limitation 11 in the longitudinal direction of the gripping part 12. In the exemplary embodiment shown here, three first locking elements 17 are provided, which make possible three different displacing positions. The first locking elements 17 are an integral component of the gripping part 12.

The grip length limitation 11 has a second locking element 18, which interacts with each one of the first locking elements 17. The second locking element 18 can be displaced or locked together with the grip length limitation 11 in each one of the three first locking elements 17.

In the exemplary embodiment shown here, the second locking element 18 has a pivot axis 20. The grip length limitation 11 can be locked in two different pivot positions by means of the pivot axis 20 in the example shown here. As an alternative, more than two pivot positions are also conceivable, especially between two and ten pivot positions. To pivot the grip length limitation 11, it can be pivoted about the pivot axis 20, in the exemplary embodiment shown here, by approximately 45° between the two pivot positions. The pivot axis 20 is aligned transversely, here especially at right angles, to a plane, which is defined by the longitudinal alignment of the gripping part 12 and of the grip length limitation 11.

Because of the three displacing positions and the two pivot positions a total of six grip size positions are possible in each of the embodiments according to FIGS. 1a through 1d.

FIG. 1a shows a maximum grip size position, in which the grip length limitation 11 is partially integrated in a transition area 48, having a U-shaped design, from the gripping part 12 to the grip strap 15. During use this transition area 48 is associated with a hand edge and/or a little finger of the hand holding the grip 10 or gripping part 12.

Figure 1B:
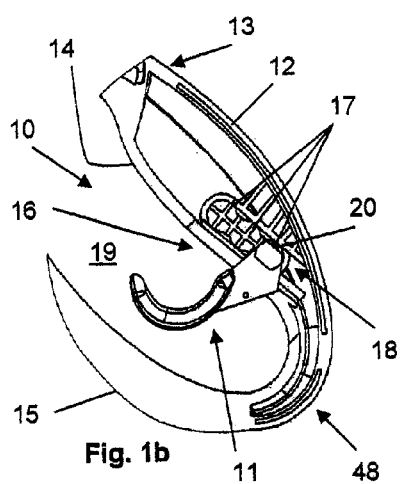
FIG. 1b is a cut-away lateral view of a first grip according to the present invention showing another of different grip size positions of a grip length limitation.

The grip size position of FIG. 1b differs from that according to FIG. 1a in that the grip length limitation 11 is pivoted about the pivot axis 20 by approximately 45° for reducing the grip length for a smaller hand width in the direction of the finger gripping side 14.

Figure 1C:
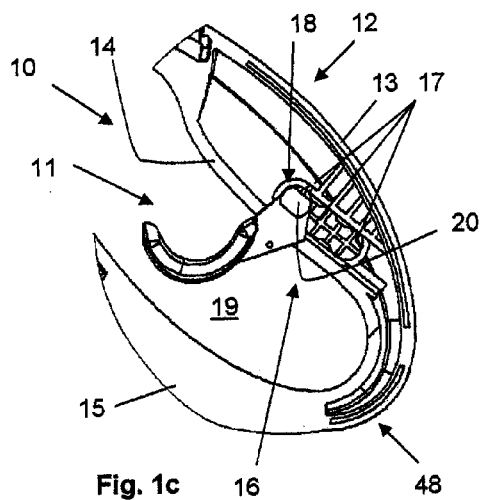
FIG. 1c is a cut-away lateral view of a first grip according to the present invention showing another of different grip size positions of a grip length limitation.

To achieve a minimum grip size position, the grip length limitation 11 can be displaced from the grip size position according to FIG. 1b into a grip size position according to FIG. 1c.

Figure 1D:
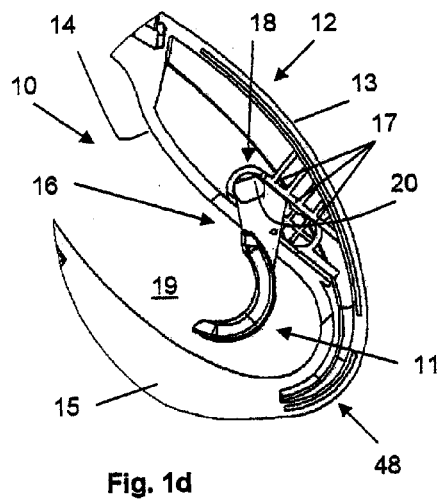
FIG. 1d is a cut-away lateral view of a first grip according to the present invention showing another of different grip size positions of a grip length limitation.

In the grip size position according to FIG. 1d, the grip length limitation 11 is pivoted from the grip size position according to FIG. 1c by approximately 45° about the pivot axis 20 away from the finger gripping side 14.

Figure 1E:
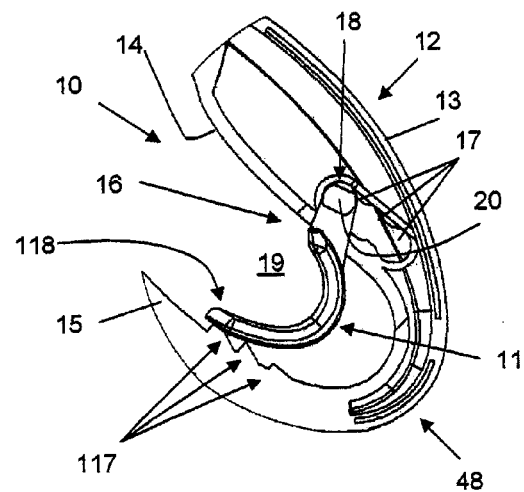
FIG. 1e is a shows cut-away lateral view of the first grip according to the present invention with additional other locking elements.

The grip size position according to FIG. 1e corresponds to the one according to FIG. 1d. Unlike FIGS. 1a through 1d, however, according to FIG. 1e, other first locking elements 117, which are associated with the grip strap 15, are provided. The grip length limitation 11 according to FIG. 1e also has another second locking element 118. This other second locking element 118 is associated with a free end of the grip length limitation 11 and interacts with each one of the other first locking elements 117. An especially stable positioning of the grip length limitation 11 is made possible as a result. An adjusting mechanism 116 is also provided here, which is designed as a purely displacing mechanism in the exemplary embodiment shown here. According to the embodiment according to FIG. 1e, a total of three grip size positions are thus feasible. As an alternative, the adjusting mechanism 116 can be designed according to the adjusting mechanism 16 both as a displacing and a pivoting mechanism. Consequently, a total of six grip size positions may be feasible.

Figure 2A:
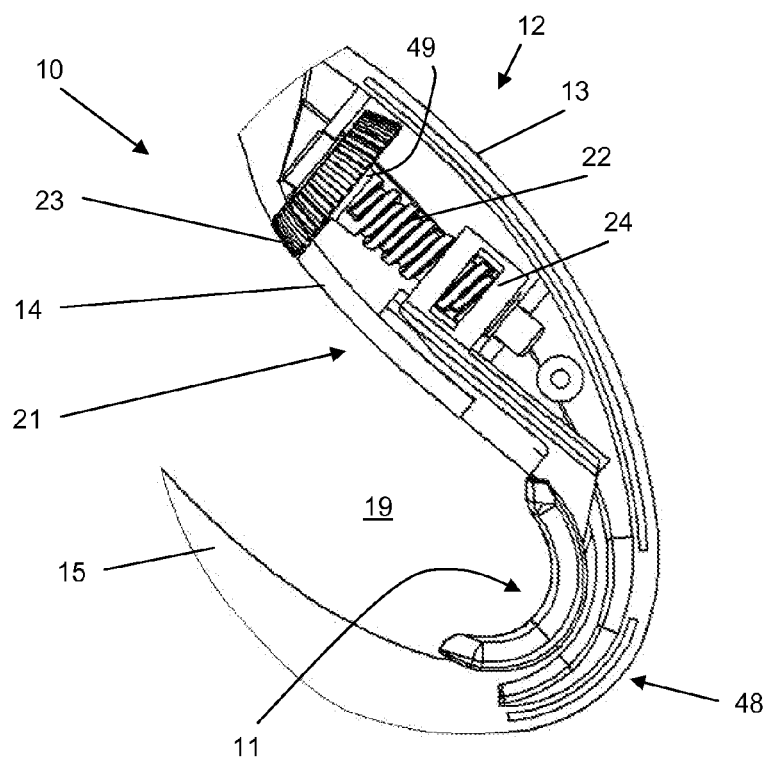
FIG. 2a is a cut-away lateral view of a second grip according to the present invention showing one of different grip size positions of a grip length limitation.
Figure 2B:
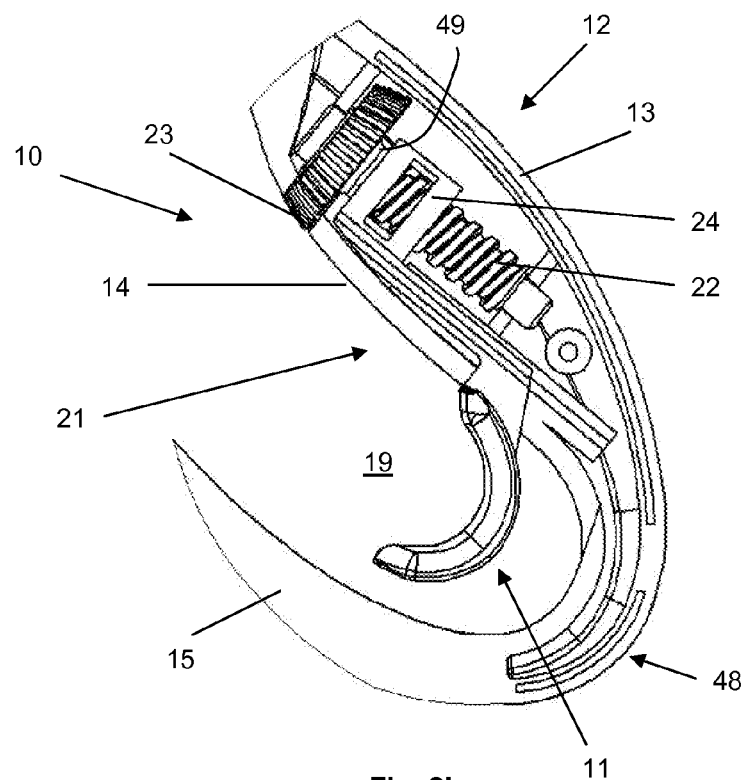
FIG. 2b is a cut-away lateral view of a second grip according to the present invention showing another of different grip size positions of a grip length limitation.

FIGS. 2a and 2b show cut-away lateral views of a second grip 10 according to the present invention with different grip size positions of a grip length limitation 11. Features that are identical to the ones mentioned previously bear the same reference numbers. Reference is therefore also made to the preceding description.

For the intermittent adjustment of the grip length limitation 11, which is likewise designed as being rigid here, an adjusting mechanism 21 is provided, which is designed as a displacing mechanism for displacing the grip length limitation 11 in the longitudinal direction of the gripping part 12 in the exemplary embodiment shown here.

Adjusting mechanism 21 is integrated into the gripping part 12 and has a spindle 22. The spindle 22 is aligned, with respect to its longitudinal axis, in the direction of, especially approximately parallel to, the longitudinal axis of the gripping part 12. The spindle 22 is rigidly connected to an actuating element 23, which is designed here as a rotating wheel or knurled wheel. An axis of rotation of the actuating element 23 is aligned parallel to the longitudinal axis of the spindle 22. The actuating element 23 is arranged here at the spindle 22 at one end facing away from the grip length limitation 11. In this case, the actuating element 23 is integrated into the gripping part 12, such that an actuation surface of the operating element 23, here a circumferential surface of the knurled wheel, is freely accessible at least partially in the area of the finger gripping side 14 in the exemplary embodiment shown here. In the example shown here, the actuation surface runs flush with the finger gripping side 14. Thus, the operating element 23 can be actuated during use comfortably by means of a finger, and especially an index finger or middle finger. As an alternative or in addition, the actuation surface may also be at least partially freely accessible at a lateral surface and/or the hand surface gripping side 13 of the gripping part 12, for example, for actuating with a thumb.

A spindle nut 24, which is nonrotatably led in the gripping part 12, is associated with the grip length limitation 11. By means of an actuation of the operating element 23 and a rotation of the spindle 22, the spindle nut 24 and the grip length limitation 11 connected therewith can be displaced in the longitudinal direction of the spindle 22 or of the gripping part 12.

Here, the displacement in the direction of the operating element 23 is limited by means of a stop 49. The stop 49 has a flat surface, with which a flat surface of the spindle nut 24 can come into contact. Because of the flat surfaces of the stop 49 and of the spindle nut 24, an undesired material wear is avoided.

Different grip size positions are feasible for adjusting the grip size for different hand widths.

Thus, FIG. 2a shows a maximum grip size position, in which the grip size limitation 11 is at least partially integrated in a transition area 48 from the gripping part 12 to the grip strap 15. During use this transition area 48 is associated with a hand edge and/or little finger of the hand holding the grip 10 or gripping part 12. In this position, the spindle nut 24 comes into contact with an inside of the transition area 48 in the area of an end of the spindle 22 facing away from the actuating element 23.

FIG. 2b shows a minimum grip size position, in which the spindle nut 24 comes into contact with the stop 49 in the area of an end of the spindle 22 facing the actuating element 23.

Figure 3A:
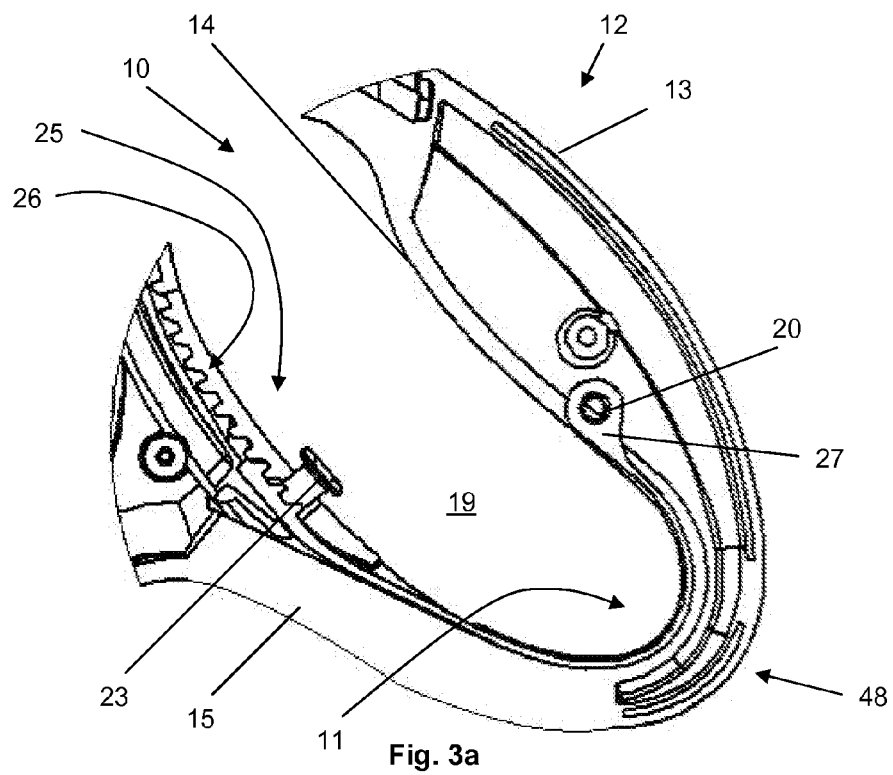
FIG. 3a is a cut-away lateral view of a third grip according to the present invention showing one of different grip size positions of a grip length limitation.
Figure 3B:
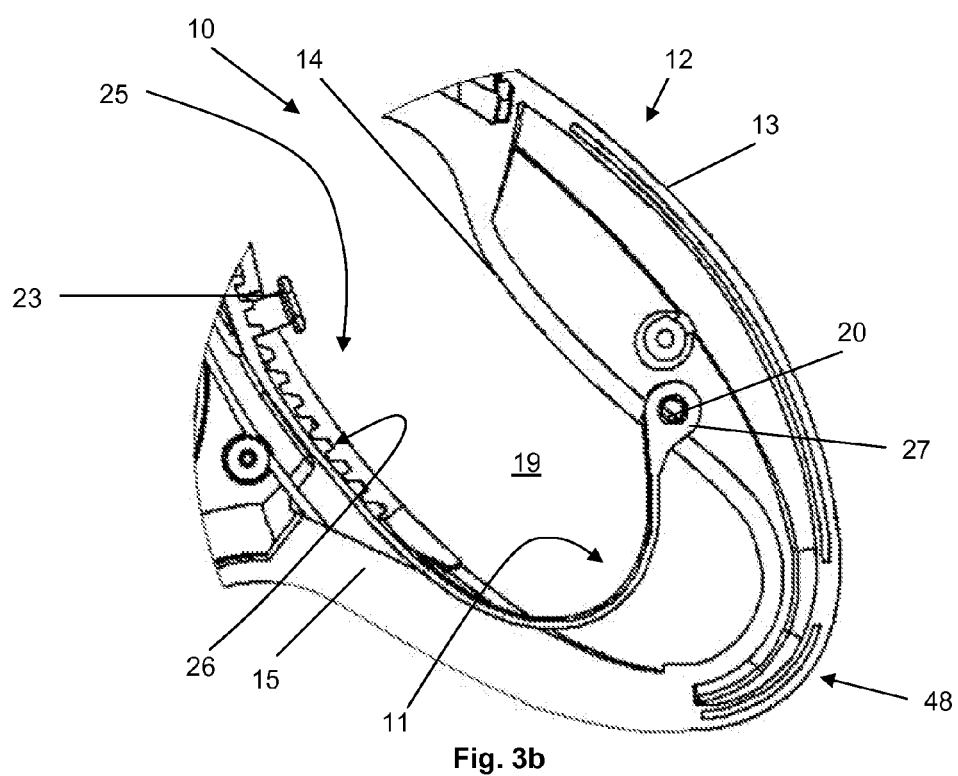
FIG. 3b is a cut-away lateral view of a third grip according to the present invention showing another of different grip size positions of a grip length limitation.

FIGS. 3a and 3b show cut-away lateral views of a third grip 10 according to the present invention with different grip size positions of a grip length limitation 11. Features that are identical to the ones mentioned previously bear the same reference numbers. Reference is therefore also made to the preceding description.

In the exemplary embodiment shown here the grip length limitation 11 is designed as being flexible. A first end of the grip length limitation 11 is associated with the gripping part 12. Herein, the grip length limitation 11 can be pivoted about a pivot axis 20 associated with the gripping part 12. The grip length limitation 11 has an eyelet 27 for fastening the grip length limitation 11 to the pivot axis 20.

A second end facing away from the first end of the grip length limitation 11 is associated with the grip strap 15 and is inserted into same. An adjusting mechanism 25 is arranged within the grip strap 15. The adjusting mechanism 25 has an actuating element 23, which is designed as a push-button here. The actuating element 23 emerges from the grip strap 15 in the direction of the finger gripping side 14.

The second end of the grip length limitation 11 is connected to the actuating element 23. Also, the actuating element 23 can be pushed in against the force of a resetting element, which is not shown in detail here, in the direction of the grip strap 15. The actuating element 23, in a state in which it is not pressed down, meshes with a row of teeth 26 rigidly connected to the grip strap 15. As a result, a locked connection is achieved. In case of an actuation of the operating element 23, and namely a pressing down of actuating element 23 in the direction of the grip strap 15, the connection between the actuating element 23 and the row of teeth 26 is broken. Then, the actuating element 23 can be continuously displaced together with the second end of the grip length limitation 11 essentially parallel to the or in the direction of the longitudinal alignment of the grip strap 15 or of the gripping part 12. As soon as the actuating element 23 is released, actuating element 23 automatically moves in the direction of the gripping part 12. Consequently, the actuating element meshes with the row of teeth 26, as a result of which a locked connection is achieved.

The adjusting mechanism 25 is designed here as a displacing and adjusting mechanism. In this case, the grip length limitation 11 is displaced by means of the actuating element 23. A pivoting of the grip length limitation about the pivot axis 20 takes place here simultaneously with the displacement.

By means of the adjusting mechanism 25 and grip length limitation 11, which has a flexible design, the length of the grip length limitation 11 can thus be changed in the area of the grip opening 19. Thus, different grip size positions can be continuously adjusted by mans of the various adjustable lengths of the grip length limitation 11.

Thus, FIG. 3a shows a maximum grip size position, in which the grip length limitation 11 is integrated into the gripping part 12 and the grip strap 15. The operating element 23 is located at a lower end of the row of teeth 26.

In FIG. 3b, the grip length limitation 11 is in a minimum grip size position. The operating element 23 is in this case located at an upper end of the row of teeth 26.

Figure 4A:
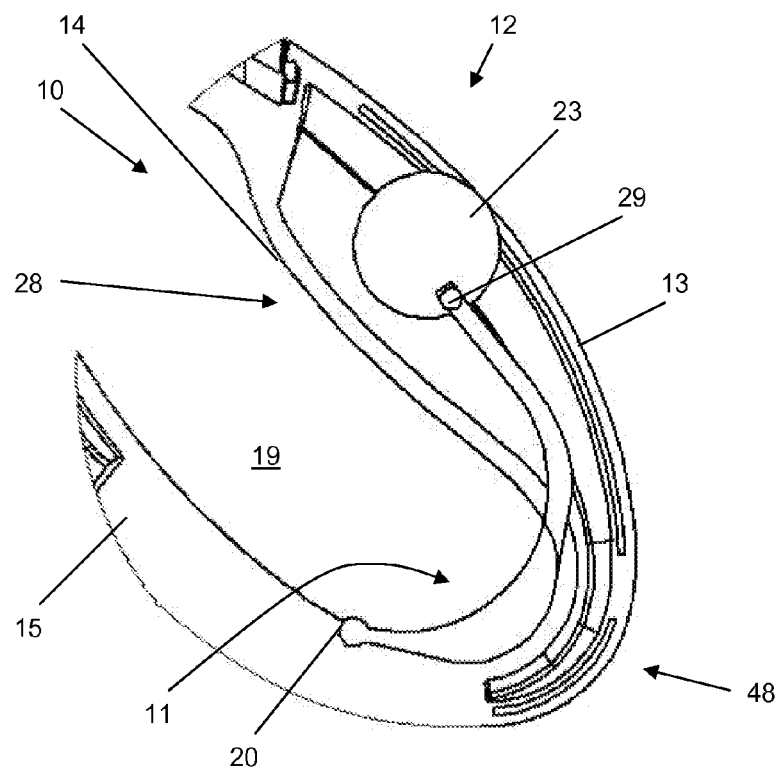
FIG. 4a is a cut-away lateral view of a fourth grip according to the present invention showing one of different grip size positions of a grip length limitation.
Figure 4B:
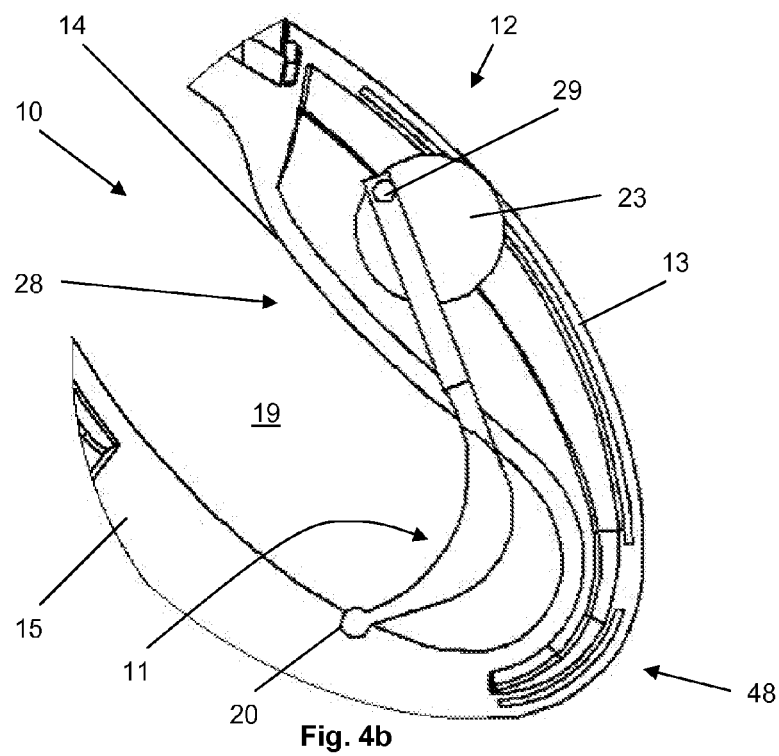
FIG. 4b is a cut-away lateral view of a fourth grip according to the present invention showing another of different grip size positions of a grip length limitation.

FIGS. 4a and 4b show cut-away lateral views of a fourth grip 10 according to the present invention with different grip size positions of a grip length limitation 11. Features that are identical to the ones mentioned previously bear the same reference numbers. Reference is therefore also made to the preceding description.

In the exemplary embodiment shown here, grip length limitation 11 has a rigid design. An adjusting mechanism 28 is integrated into the gripping part 12. Here, a first end of the grip length limitation 11 is inserted into the gripping part 12.

An actuating element 23 is also arranged in the gripping part 12, whereby the actuating element 23 is designed as a rotatable turntable in the exemplary embodiment shown here. An actuation surface is freely accessible here as a circumferential surface of the actuating element 23 at least partially in the area of the hand surface gripping side 13 for actuating the actuating element 23. The first end of grip length limitation 11 is outside the center of the operating element 23 or eccentric and is rotatably connected to the actuating element 23 about an axis of rotation 29.

A second end facing away from the first end of the grip length limitation 11 is associated with the grip strap 15. Here, the second end or the grip length limitation 11 can be pivoted about a pivot axis 20 associated with the grip strap 15.

Thus, the adjusting mechanism 28 makes possible continuously adjustable grip size positions. The adjusting mechanism 28 is designed as a pivoting mechanism here.

FIG. 4a shows a maximum grip size position, in which the axis of rotation 29 faces the transition area 48 from the gripping part 12 to the grip strap 15. During use this transition area 48 is associated with a hand edge and/or a little finger of the hand holding the grip 10 or the gripping part 12. Here, the grip length limitation 11 is joined to this transition area 48 in a positive locking manner.

By comparison, FIG. 4b shows a minimum grip size position, in which the axis of rotation 29 is facing away from the transition area 48 from the gripping part 12 to the grip strap 15. Here, the grip length limitation 11 is pivoted about the pivot axis 20 away from the transition area 48 compared to FIG. 4a.

Figure 5A:
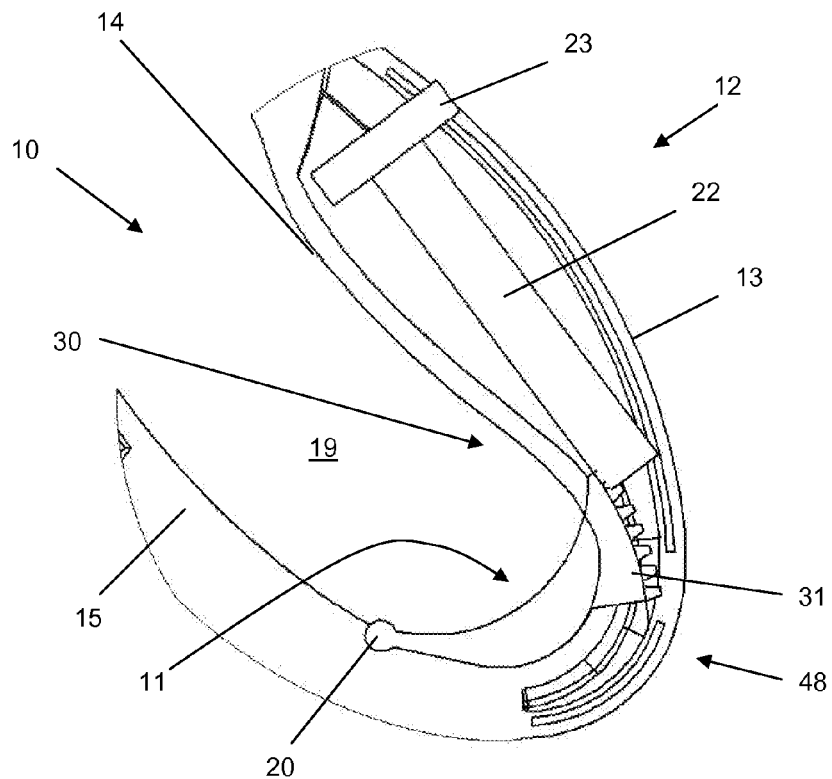
FIG. 5a is a cut-away lateral view of a fifth grip according to the present invention showing one of different grip size positions of a grip length limitation.
Figure 5B:
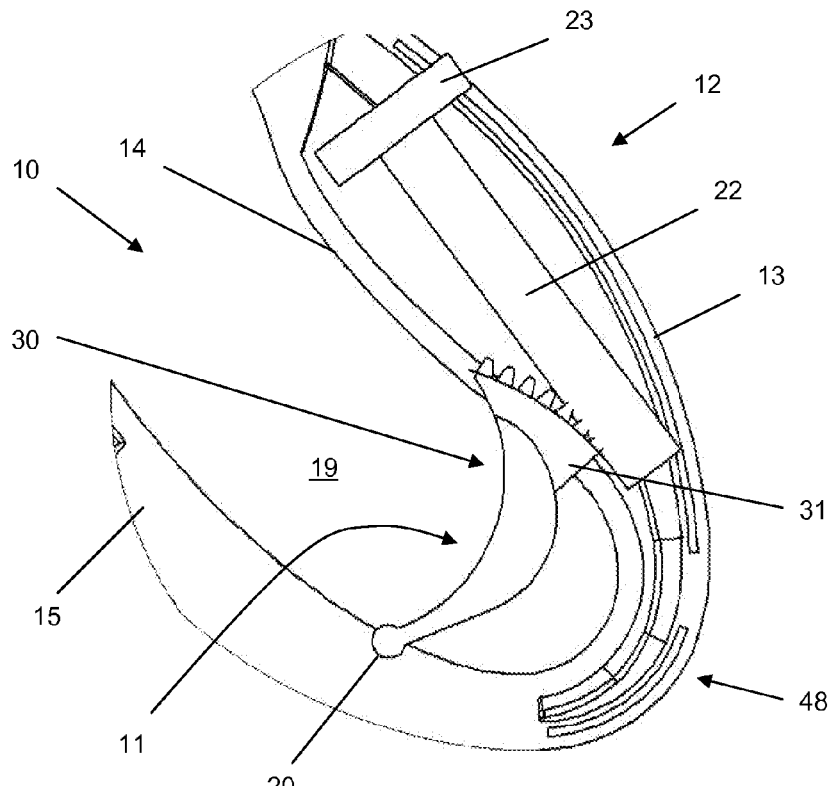
FIG. 5b is a cut-away lateral view of a fifth grip according to the present invention showing another of different grip size positions of a grip length limitation.

FIGS. 5a and 5b show cut-away lateral views of a fifth grip 10 according to the present invention with different grip size positions of a grip length limitation 11. Features that are identical to the ones mentioned previously bear the same reference numbers. Reference is therefore also made to the preceding description.

An adjusting mechanism 30 is arranged in the gripping part 12. The adjusting mechanism 30 has a spindle 22, which is rotatably mounted within the gripping part 12 and is aligned, with respect to the longitudinal axis of spindle 22, in the direction of or approximately parallel to the longitudinal alignment of the gripping part 12. The spindle 22 is rigidly connected to an actuating element 23, which here is designed as a rotating wheel or a knurled wheel—comparable to the embodiment according to FIGS. 2a and 2b. An axis of rotation of actuating element 23 is aligned parallel to the longitudinal axis of the spindle 22. The actuating element 23 is arranged at the spindle 22 at an end facing away from the grip length limitation 11. Here, the actuating element 23 is integrated into the gripping part 12, such that in the exemplary embodiment shown here, an actuation surface of operating element 23, here a circumferential surface of the knurled wheel, is at least partially freely accessible in the area of the hand surface gripping side 13. During use the operating element 23 can be comfortably actuated by means of a thumb. As an alternative or in addition, the actuation surface may also be at least partially freely accessible at a lateral surface and/or the finger gripping side 14 of the gripping part 12, for example, for actuating with a finger.

In the exemplary embodiment shown here, the grip length limitation 11 again has a rigid design. A first end of the grip length limitation 11 is inserted into the gripping part 12 and has a toothed comb 31. The toothed comb 31 meshes at least partially with the spindle 22. A second end facing away from the first end of the grip length limitation 11 is associated with the grip strap 15—comparable to the embodiment according to FIGS. 4a and 4b. Here, the second end or grip length limitation 11 can be pivoted about a pivot axis 20 associated with the grip strap 15.

When the adjusting mechanism 30, which is designed here as a pivoting mechanism, is actuated, the spindle 22 is at the same time rotated via a rotation of the actuation element 23. Consequently, the grip length limitation 11 can be pivoted about the pivot axis 20 because of the interaction of the toothed comb 31 with the spindle 22. Thus, various grip size positions can be continuously adjusted.

According to FIG. 5a, a maximum grip size position is shown, in which the grip length limitation 11 is in contact with the transition area 48 from the gripping part 12 to the grip strap 15. During use, this transition area 48 is associated with a hand edge and/or a little finger of the hand holding the grip 10 or the gripping part 12. According to FIG. 5b, a minimum grip size position is shown, in which the grip length limitation 11 is pivoted about the pivot axis 20 away from the transition area 48—in comparison to FIG. 5a.

Figure 6A:
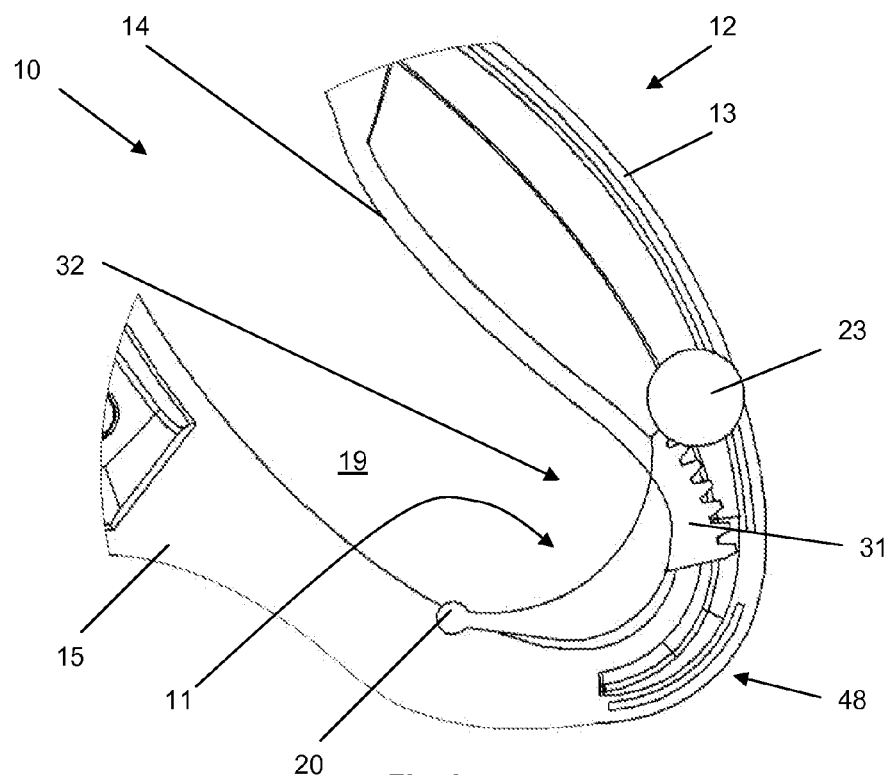
FIG. 6a is a cut-away lateral view of a sixth grip according to the present invention showing one of different grip size positions of a grip length limitation.
Figure 6B:
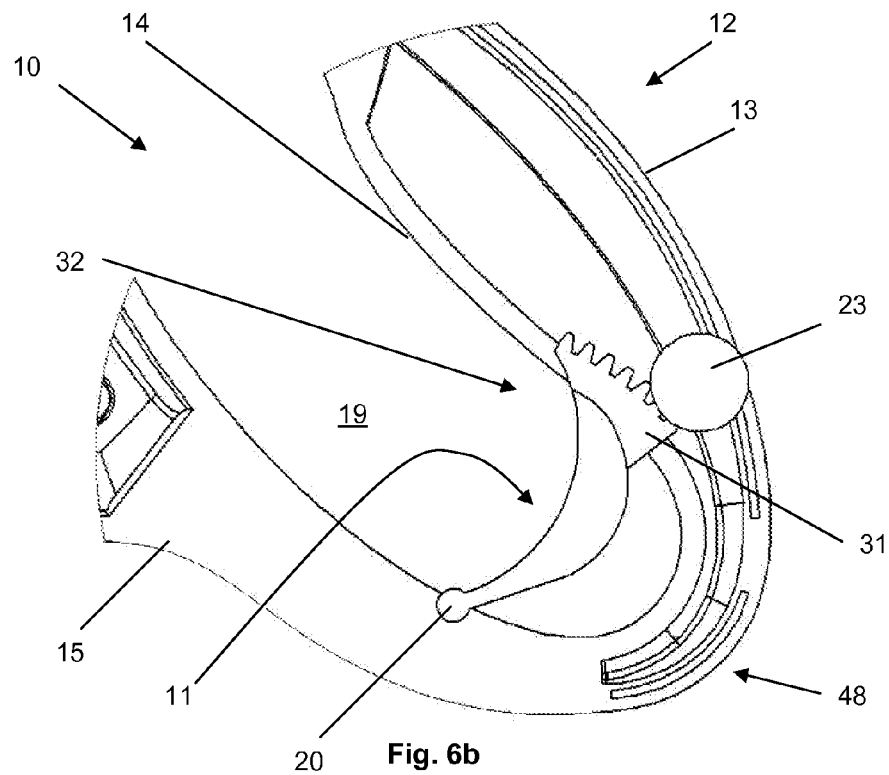
FIG. 6b is a cut-away lateral view of a sixth grip according to the present invention showing another of different grip size positions of a grip length limitation.

FIGS. 6a and 6b show cut-away lateral views of a sixth grip 10 according to the present invention with different grip size positions of a grip length limitation 11. Features that are identical to the ones mentioned previously bear the same reference numbers. Reference is therefore also made to the preceding description.

Grip length limitation 11 is designed here corresponding to the embodiment according to FIGS. 5a and 5b and accordingly has a first end with a toothed comb 31 and a second end with a pivot axis 20.

The actuating element 23 here is likewise designed as a rotating wheel or as a knurled wheel. The actuating element 23 is integrated in the gripping part 12, such that in the exemplary embodiment shown here, an actuation surface of the operating element 23, here a circumferential surface of the knurled wheel, is at least partially freely accessible in the area of the hand surface gripping side 13. However, the axis of the actuating element 23 in the exemplary embodiment shown here is arranged parallel to the pivot axis 20. The toothed comb 31 meshes with a gear element, which is not shown in detail here, of the actuating element 23 and interacts with same. Consequently, the grip length limitation 11 can be actuated directly by the actuating element 23. A spindle is dispensable.

When the adjusting mechanism 32, which is likewise designed as a pivoting mechanism here, is actuated, the grip length limitation 11 can be pivoted about the pivot axis 20 via a rotation of the actuating element 23 and because of the interaction of the toothed comb 31 with the actuating element 23. Thus, various grip size positions can be continuously adjusted.

According to FIG. 6a, a maximum grip size position is shown, in which the grip length limitation 11 is in contact with the transition area 48 from the gripping part 12 to the grip strap 15. During use, this transition area 48 is associated with a hand edge and/or a little finger of the hand holding the grip 10 or the gripping part 12.

According to FIG. 6b, a minimum grip size position is shown, in which the grip length limitation 11 is pivoted about the pivot axis 20 away from the transition area 48 in comparison to FIG. 6a.

Figure 7A:
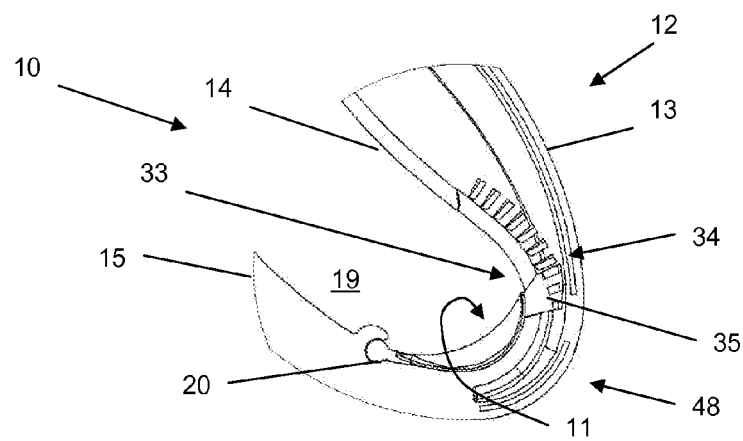
FIG. 7a is a cut-away lateral view of a seventh grip according to the present invention showing one of different grip size positions of a grip length limitation.
Figure 7B:
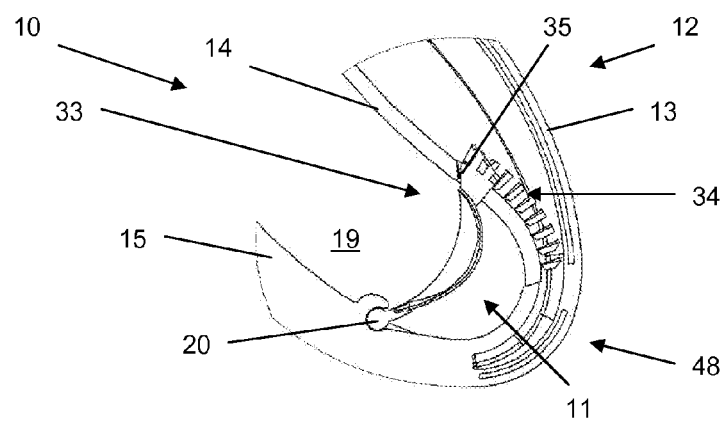
FIG. 7b is a cut-away lateral view of a seventh grip according to the present invention showing another of different grip size positions of a grip length limitation.

FIGS. 7a and 7b show cut-away lateral views of a seventh grip 10 according to the present invention with different grip size positions of a grip length limitation 11. Features that are identical to the ones mentioned previously bear the same reference numbers. Reference is therefore also made to the preceding description.

An adjusting mechanism 33 designed as a pivoting mechanism is associated with the gripping part 12 in the exemplary embodiment shown here. The adjusting mechanism 33 has a locking strip 34, which is inserted in the gripping part 12. The locking strip 34 interacts with locking parts 35, 36, which are associated with an end of the grip length limitation 11 facing the gripping part 12.

A second end facing away from the first end of the grip length limitation 11 has a pivot axis 20 that is associated with the grip strap 15.

FIG. 7a shows a maximum grip size position, in which the grip length limitation 11 is in contact with the transition area 48 from the gripping part 12 to the grip strap 15. During use, this transition area 48 is associated with a hand edge and/or a little finger of the hand holding the grip 10 or the gripping part 12.

According to FIG. 7b, a minimum grip size position is shown, in which the grip length limitation 11 is pivoted about the pivot axis 20 away from the transition area 48 in comparison to FIG. 7a.

Figure 7C:
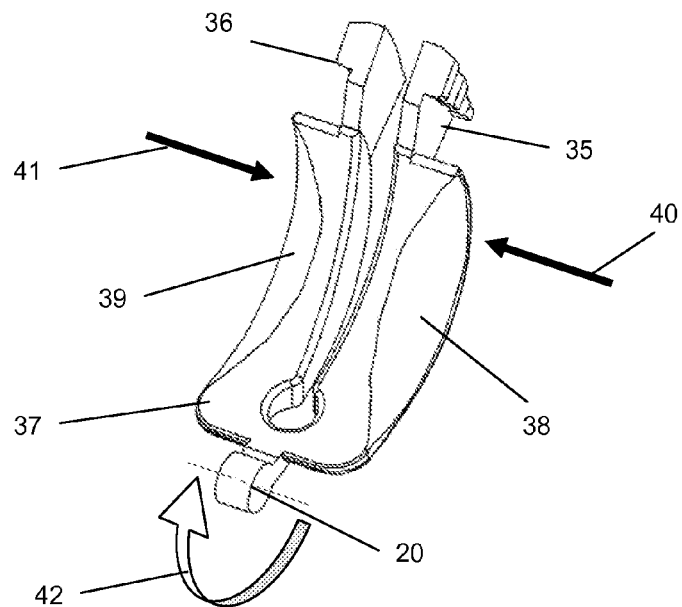
FIG. 7c is a perspective lateral view of the grip length limitation according to FIGS. 7a and 7b.

The mode of operation of the adjusting mechanism 33 arises from a combination of FIGS. 7a and 7b with the following explanations regarding FIG. 7c.

FIG. 7c shows a perspective lateral view of grip length limitation 11 in the embodiment according to FIGS. 7a and 7b. Features that are identical to the ones mentioned previously bear the same reference numbers. Reference is therefore also made to the preceding description.

In the exemplary embodiment shown here, the grip length limitation 11 has a basic body 37, which has a U-shaped design. As legs of the U-shaped basic body 37, this has two wings 38, 39. A locking part 35 or 36 is arranged at each free end of the wings 38, 39. The wings 38, 39 and thus the locking parts 35, 36 can be moved elastically toward one another according to arrows 40, 41.

For adjusting the grip size for adapting to a hand width, first the wings 38, 39 are moved towards one another in the direction of arrows 40, 41 by means of fingers and thumb of one hand. At the same time, the locking parts 35, 36 are consequently also moved towards one another, as a result of which these no longer mesh with the locking strip 34. Then, the grip length limitation 11 can be pivoted about pivot axis 20, for example, according to arrow 42 or in a direction opposite arrow 42. If the desired locking position is reached, the wings 38, 39 are released. Consequently, the wings 38, 39 return to their original position according to FIG. 7c. At the same time, the locking parts 35, 36 are moved away from one another and mesh with the locking strip 34. Regardless of the shape of the locking strip 34, intermittent or concrete, preset grip size positions are feasible with the adjusting mechanism 33.

Figure 8A:
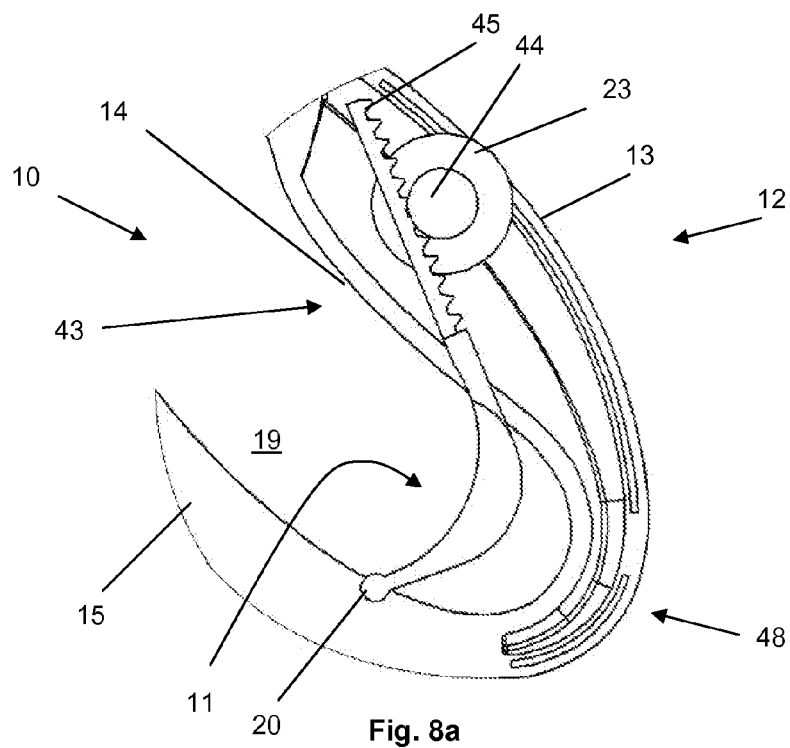
FIG. 8a is a cut-away lateral view of a eighth grip according to the present invention showing one of different grip size positions of a grip length limitation.
Figure 8B:
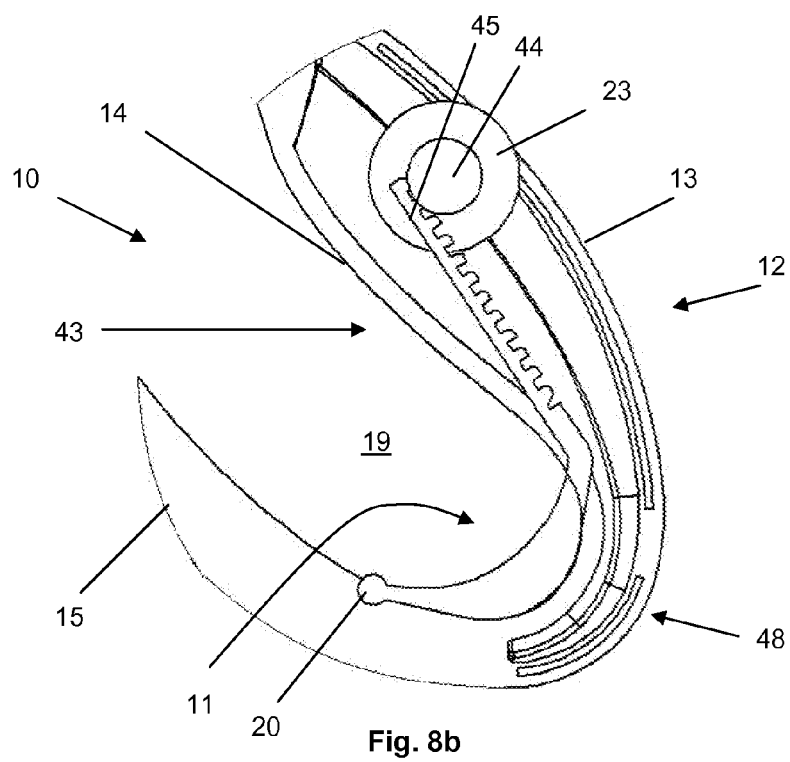
FIG. 8b is a cut-away lateral view of a eighth grip according to the present invention showing another of different grip size positions of a grip length limitation.

FIGS. 8a and 8b show cut-away lateral views of an eighth grip 10 according to the present invention with different grip size positions of a grip length limitation 11. Features that are identical to the ones mentioned previously bear the same reference numbers. Reference is therefore also made to the preceding description.

An adjusting mechanism 43, which is designed as a pivoting mechanism, is also associated with the gripping part 12 in the exemplary embodiment shown here. In this case, an actuating element 23 is provided that is designed in this case as a rotating wheel or knurled wheel. An axis of rotation of the actuating element 23 is aligned at right angles to a plane, which is defined by the gripping part 12 and the grip strap 15. The actuating element 23 is positioned in the gripping part 12, such that a circumferential surface of the actuating element 23 is freely accessible as an operating surface at least partially in the area of the hand surface gripping side 13. As a result, an actuation of the actuating element 23 is made possible, for example, with a thumb. A gear 44 is connected to the actuating element 23 concentrically to the actuating element 23. The position of the axis of rotation of the actuating element 23 here is identical to the position of the axis of rotation of the gear 44. In the exemplary embodiment shown here, the gear 44 has a smaller radius than the actuating element 23.

A first end of the grip length limitation 11 is inserted into the gripping part 12 and has a toothed track 45. The toothed track 45 meshes with the gear 44 and thus interacts with same. A second end of the grip length limitation 11 facing away from the first end has a pivot axis 20 that is associated with the grip strap 15.

When the actuating element 23 is actuated, the gear 44 connected to same rotates at the same time. The toothed track 45 can be displaced or moved in the longitudinal direction of the gripping part 12 by means of the gear 44.

Thus, when the adjusting mechanism 43 is actuated, the grip length limitation 11 can be pivoted about the pivot axis 20 via a rotation of the actuating element 23 and because of the interaction of the gear 44 with toothed track 45. Thus, various grip size positions can be continuously adjusted.

According to FIG. 8a, a minimum grip size position is shown, in which the grip length limitation 11 is pivoted about the pivot axis 20 away from the transition area 48 of the gripping part 12 to the grip strap 15. During use, this transition area 48 is associated with a hand edge and/or a little finger of the hand holding the grip 10 or the gripping part 12.

According to FIG. 8b, a maximum grip size position is shown, in which the grip length limitation 11 is in contact with the transition area 48 from the gripping part 12 to the grip strap 15.

Figure 9A:
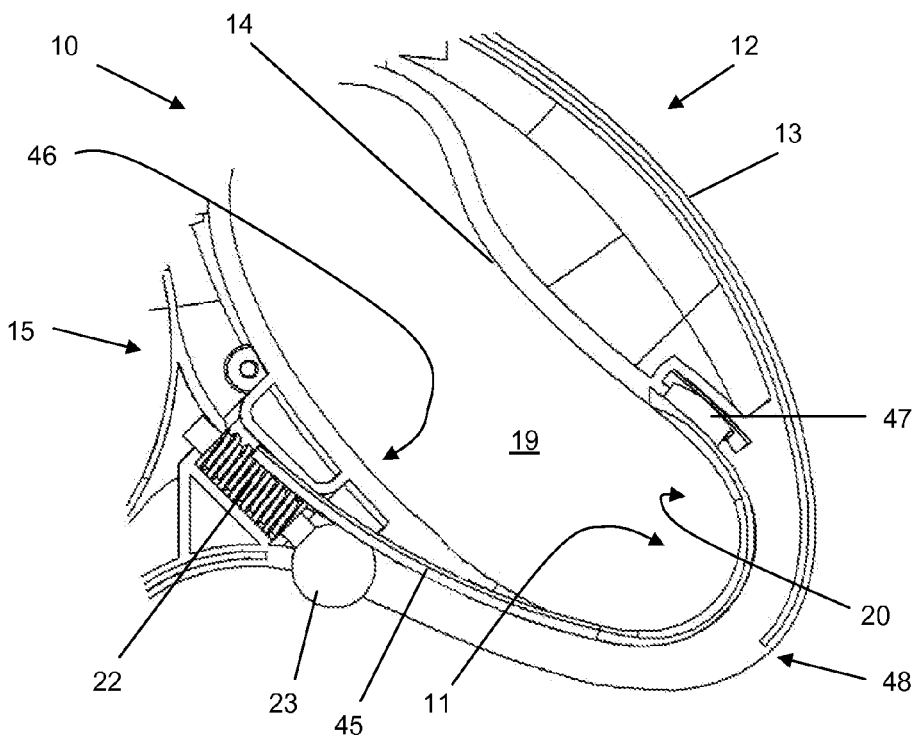
FIG. 9a is a cut-away lateral view of another grip according to the present invention showing one of different grip size positions of a grip length limitation.
Figure 9B:
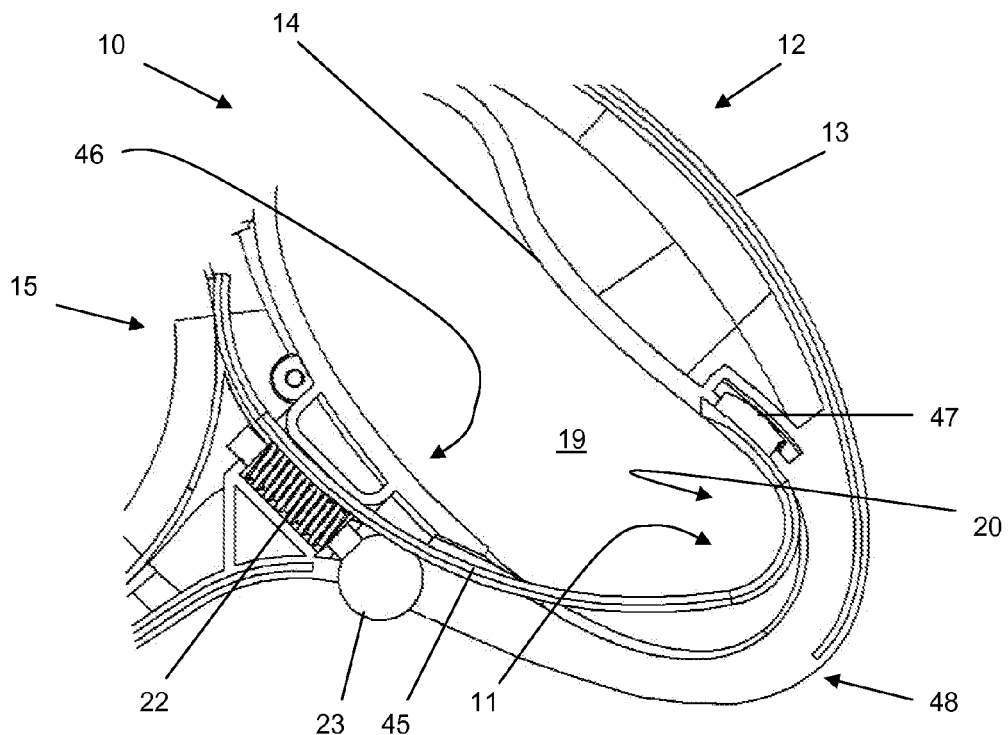
FIG. 9b is a cut-away lateral view of another grip according to the present invention showing another of different grip size positions of a grip length limitation.

FIGS. 9a and 9b show cut-away lateral views of another grip 10 according to the present invention with different grip size positions of a grip length limitation 11. Features that are identical to the ones mentioned previously bear the same reference numbers. Reference is therefore also made to the preceding description.

An adjusting mechanism 46 is associated with grip strap 15 in the exemplary embodiment shown here. An actuating element 23, which has a spherical design here, is provided on a side of the grip strap 15 facing away from the finger gripping side 14.

The actuating element 23 is rigidly connected to a first end of a spindle 22. Spindle 22 is rotatably mounted in the grip strap 15.

The grip length limitation 11 is associated with the gripping part 12 with a first end, whereby the first end is rigidly connected to the gripping part 12 by means of a fastening 47 in the area of the finger gripping side 14. A second end of the grip length limitation 11 facing away from the first end is inserted into the grip strap 15 and has a toothed track 45. The tooth track 45 whish has a flexible design in this exemplary embodiment meshes with the spindle 22 in the area of the spindle 22 and interacts with same.

When actuating element 23 is actuated, the spindle 22 connected to same rotates at the same time. The toothed track 45 can be displaced or moved within the grip strap 15 by means of the spindle 22. Thus, when the adjusting mechanism 46 is actuated, the grip length limitation 11 can be pivoted about a pivot axis 20 via a rotation of the actuating element 23 and because of the interaction of the spindle 22 with the toothed track 45.

The length of the grip length limitation 11 in the area of grip opening 19 can be changed by means of the adjusting mechanism 46 and the grip length limitation 11, which has a flexible shape. Thus, various grip size positions can be continuously adjusted by means of the various adjustable lengths of the grip length limitation 11. In the exemplary embodiment shown here, the pivot axis 20 has a virtual rather than material design and lies in the area of a fastening 47 for the grip length limitation 11 in the area of the grip strap 15.

The adjusting mechanism 46 is designed as a displacing and adjusting mechanism in the exemplary embodiment shown here. Here, a displacement takes place by means of the actuating element 23 in interaction with the spindle 22 and the toothed track 45. At the same time, a pivoting takes place about the pivot axis 20.

FIG. 9a shows a maximum grip size position, in which the grip length limitation 11, which has a flexible design in this embodiment, is in contact with the transition area 48 from the gripping part 12 to the grip strap 15. During use, this transition area 48 is associated with a hand edge and/or a little finger of the hand holding the grip 10 or the gripping part 12.

According to FIG. 9b, a minimum grip size position is shown, in which the grip length limitation 11 is pivoted about a pivot axis 20 away from the transition area 48 in comparison to FIG. 9a. The pivot axis 20 is associated with the gripping part 12 here.

All grips 10, as described above concerning FIGS. 1a through 9b, may be designed as an integral component with a housing.

For example, the grip 10 may be integrated in a housing of a leash device. The leash device may be provided for rolling up and unrolling a leash. Here, the leash or leash device is used for leading an animal, for example, a dog or a cat. To this end, the leash may be guided within the housing on a leash roller and can be led out of the housing by means of a leash opening. A brake button may be provided for stopping the unrolling process and thus for limiting the unrolled leash length.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 10 | Grip |
| 11 | Grip length limitation |
| 12 | Gripping part |
| 13 | Hand surface gripping side |
| 14 | Finger gripping side |
| 15 | Grip strap |
| 16 | Adjusting mechanism |
| 116 | Adjusting mechanism |
| 17 | First locking element |
| 117 | Another first locking element |
| 18 | Second locking element |
| 118 | Another second locking element |
| 19 | Grip opening |
| 20 | Pivot axis |
| 21 | Adjusting mechanism |
| 22 | Spindle |
| 23 | Actuating element |
| 24 | Spindle nut |
| 25 | Adjusting mechanism |
| 26 | Row of teeth |
| 27 | Eyelet |
| 28 | Adjusting mechanism |
| 29 | Axis of rotation |
| 30 | Adjusting mechanism |
| 31 | Toothed comb |
| 32 | Adjusting mechanism |
| 33 | Adjusting mechanism |
| 34 | Locking strip |
| 35 | Locking part |
| 36 | Locking part |
| 37 | Basic body |
| 38 | Wing |
| 39 | Wing |
| 40 | Arrow |
| 41 | Arrow |
| 42 | Arrow |
| 43 | Adjusting mechanism |
| 44 | Gear |
| 45 | Toothed track |
| 46 | Adjusting mechanism |
| 47 | Fastening means |
| 48 | Transition area |
| 49 | Stop |

What is claimed is:

1. A leash device for rolling up and unrolling a leash for leading an animal, the leash device comprising:
a leash device housing; and
a grip for grasping with one hand, the grip comprising:
a rigid gripping part, said rigid gripping part having a user engaging surface for contacting at least a portion of a hand of a user, wherein an animal is controlled via at least said rigid gripping part;
an adjustable grip length limitation for adjusting a grip length for different hand widths;
a grip strap integrally connected to said gripping part to form a one piece grip strap and gripping part structure, whereby said grip strap faces a finger gripping side of the gripping part and said grip strap and said gripping part define a grip opening, said grip opening being enclosed by the grip strap and the gripping part for at least partial passing fingers through said grip opening, said grip length limitation being arranged within the grip opening;
a housing part for a leash roller arranged in an area of the grip strap facing away from the finger gripping side, wherein in a maximum grip size position, said grip length limitation is at least partially integrated into the grip strap, whereby said grip length limitation is adjustable for reducing a grip size position in a longitudinal direction of the gripping part by displacing said grip length limitation within said grip opening.

2. A leash device in accordance with claim 1, further comprising an adjusting mechanism for one of continuously and/or intermittently adjusting and positioning the grip length limitation in the longitudinal direction of the gripping part, wherein the adjusting mechanism is at least partially integrated inside a hollow gripping part.

3. A leash device in accordance with claim 2, wherein the adjusting mechanism comprises a displacing mechanism, said displacing mechanism having a spindle arranged inside said hollow gripping part, which is aligned with respect to a longitudinal axis thereof in a direction of the longitudinal axis of said gripping part, wherein an actuating element for actuating said displacing mechanism is arranged at one end of said spindle facing away from the grip length limitation.

4. A leash device in accordance with claim 2, further comprising:
an actuating element for actuating the adjusting mechanism, whereby the actuating element is at least partially integrated into said hollow gripping part such that an actuation surface of the actuation element is freely accessible at least partially in the area of the gripping part for use by means of a finger or thumb of one hand engaging the gripping part.

5. A leash device in accordance with claim 4, wherein the adjusting mechanism comprises a displacing mechanism, said displacing mechanism having a spindle arranged inside said hollow gripping part, which is aligned with respect to a longitudinal axis thereof in a direction of the longitudinal axis of said gripping part, wherein an actuating element for actuating said displacing mechanism is arranged at one end of said spindle facing away from said grip length limitation.

6. A leash device in accordance with claim 1, wherein the grip length limitation is U-shaped, the gripping part having a hand surface gripping side for the at least partial placing of a hand inner surface thereon and of a finger gripping side for the at least partial placing of finger inner surfaces thereon.

7. A leash device in accordance with claim 1, wherein the grip length limitation is arranged at the gripping part for at least partial embracing of a little finger and/or a hand edge.

8. A leash device in accordance with claim 7, wherein in a maximum grip size position, the grip length limitation is at least partially integrated into the gripping part and/or the grip strap, whereby the grip length limitation can be adjusted for reducing the grip size position in the longitudinal direction of the gripping part.

9. A leash device in accordance with claim 7, further comprising an adjusting mechanism for one of continuously and/or intermittently adjusting and/or positioning the grip length limitation in the longitudinal direction of the gripping part, wherein the adjusting mechanism comprises a displacing mechanism and/or as a pivoting mechanism with a pivot axis associated with the gripping part or the grip strap and/or can be displaced with the displacing mechanism, for pivoting the grip length limitation.

10. A leash device in accordance with claim 9, wherein the displacing mechanism has a spindle arranged in the gripping part or in the grip strap, whereby the spindle is actuated by means of an actuating element with a rotating wheel, for adjusting the grip length limitation interacting with the spindle.

11. A leash device in accordance with claim 1, wherein in said maximum grip size position, the grip length limitation is at least partially integrated in a U-shaped transition area, said U-shaped transition area being integrally connected to said gripping part and said grip strap, wherein said one piece gripping part and gripping part structure comprises said U-shaped transition area, wherein said grip length limitation is displaced from said transition area by an at least linear movement within said grip opening for reducing the grip size position in the longitudinal direction of the gripping part.

12. A leash device for rolling up and unrolling a leash for leading an animal, the leash device comprising:
a leash device housing; and
a grip for grasping with one hand, the grip comprising:
a rigid gripping part, said rigid gripping part having a user engaging surface for contacting at least a portion of a hand of a user, wherein an animal is controlled via at least said rigid gripping part; and
an adjustable grip length limitation for adjusting a grip length for different hand widths;
a grip strap integrally connected to said gripping part to form a single, one-piece structure, whereby the grip strap faces a finger gripping side of the gripping part and the grip strap and said gripping part form a grip opening for receiving at least partially one or more fingers, said grip length limitation being arranged within the grip opening;
a housing part for a leash roller arranged in an area of the grip strap facing away from the finger gripping side, wherein in a maximum grip size position, the grip length limitation is at least partially integrated into the grip strap, whereby the grip length limitation can be adjusted for reducing the grip size position in the longitudinal direction of the gripping part by displacing the grip length limitation within the grip opening, said gripping part being hollow;
an adjusting mechanism for one of continuously and/or intermittently adjusting and positioning the grip length limitation in the longitudinal direction of the gripping part, wherein the adjusting mechanism is at least partially integrated inside the hollow gripping part; and
an actuating element for actuating the adjusting mechanism, whereby the actuating element is at least partially integrated into the hollow gripping part such that an actuation surface of the actuation element is freely accessible at least partially in an area of the gripping part for use by means of a finger or thumb of one hand engaging the gripping part.

13. A leash device in accordance with claim 12, wherein:
the grip length limitation is U-shaped;
the gripping part has a hand surface gripping side for the at least partial placing of a hand inner surface thereon and a finger gripping side for the at least partial placing of finger inner surfaces thereon.

14. A leash device in accordance with claim 12, wherein the grip length limitation is arranged at the gripping part for an at least partial embracing of a little finger and/or a hand edge.

15. A leash device in accordance with claim 12, wherein the adjusting mechanism comprises a displacing mechanism and/or as a pivoting mechanism with a pivot axis associated with the gripping part and/or displaceable with the displacing mechanism, for pivoting the grip length limitation.

16. A leash device in accordance with claim 12, wherein said single, one-piece structure comprises a U-shaped transition area, said grip strap being connected to said gripping part via said U-shaped transition area, said U-shaped transition area comprising a transition area contour, said grip length limitation having a grip length limitation contour, said grip length limitation contour corresponding to said transition area contour.

17. A leash device in accordance with claim 16, wherein said grip length limitation engages at least a portion of said U-shaped transition area in said maximum grip size position.

18. A leash device for rolling up and unrolling a leash for leading an animal, the leash device comprising:
a leash device housing; and
a grip for grasping with one hand, the grip comprising:
a rigid gripping part, said rigid gripping part having a user engaging surface for contacting at least a portion of a hand of a user, wherein an animal is controlled via at least said rigid gripping part;
an adjustable grip length limitation for adjusting a grip length for different hand widths;
a grip strap integrally connected to the gripping part to form a single, one-piece structure, whereby the grip strap faces a finger gripping side of the gripping part and the grip strap and gripping part form a grip opening enclosed by the grip strap and the gripping part for at least partial passing through of fingers, whereby the grip length limitation is arranged within the grip opening;
a housing part for a leash roller arranged in an area of the grip strap facing away from the finger gripping side, wherein in a maximum grip size position, the grip length limitation is at least partially integrated into the grip strap, whereby the grip length limitation can be adjusted for reducing the grip size position in the longitudinal direction of the gripping part by displacing the grip length limitation within the grip opening, wherein in said maximum grip size position the grip length limitation is at least partially integrated in a U-shaped transition area, said U-shaped transition area being integrally connected to said gripping part and said grip strap, wherein the grip length limitation is displaced from the transition area by an at least linear movement within the grip opening for reducing the grip size position in the longitudinal direction of the gripping part, said gripping part being hollow;
an adjusting mechanism for one of continuously and/or intermittently adjusting and positioning the grip length limitation in the longitudinal direction of the gripping part, wherein the adjusting mechanism is at least partially integrated inside the hollow gripping part;

an actuating element for actuating the adjusting mechanism, whereby the actuating element is at least partially integrated into the hollow gripping part such that an actuation surface of the actuation element is freely accessible at least partially in the area of the gripping part for use by means of a finger or thumb of one hand engaging the gripping part, said adjusting mechanism comprising a displacing mechanism, said displacing mechanism having a spindle arranged inside the hollow gripping part, which is aligned with respect to a longitudinal axis thereof in a direction of the longitudinal axis of the gripping part, said actuating element for actuating the displacing mechanism being arranged at one end of the spindle facing away from the grip length limitation.

19. A leash device in accordance with claim 18, wherein said single, one-piece structure comprises a U-shaped transition area, said grip strap being connected to said gripping part via said U-shaped transition area, said U-shaped transition area comprising a transition area contour, said grip length limitation having a grip length limitation contour, said grip length limitation contour corresponding to said transition area contour.

20. A leash device in accordance with claim 19, wherein said grip length limitation engages at least a portion of said U-shaped transition area in said maximum grip size position.

* * * * *